United States Patent [19]

Heuschen et al.

[11] 3,928,100

[45] Dec. 23, 1975

[54] CORNER JOINT FOR HOLLOW PROFILE MEMBERS OF PLASTIC WITH REINFORCING FRAME

[75] Inventors: Alexander Heuschen, Troisdorf; Hans Schaefer, Cologne; Wolfgang Budich; Robert Krah, both of Troisdorf-Sieglar; Karl Obermeier, Rheidt, Troisdorf, all of Germany

[73] Assignee: Dynamit Nobel Aktiengesellschaft, Germany

[22] Filed: June 20, 1974

[21] Appl. No.: 481,336

Related U.S. Application Data

[62] Division of Ser. No. 236,639, March 21, 1972, Pat. No. 3,836,274.

[52] U.S. Cl. ............... 156/92; 29/469; 29/470; 52/475; 52/656; 52/758 H; 52/758 F; 156/71; 156/304
[51] Int. Cl.[2] ............................................. B32B 7/08
[58] Field of Search ......... 156/71, 92, 304; 52/475, 52/656, 657, 758 F, 758 H; 29/469, 470

[56] References Cited

UNITED STATES PATENTS

| 3,240,648 | 3/1966 | Bradley | 156/304 |
|---|---|---|---|
| 3,302,351 | 2/1967 | Trulaske | 52/656 |

*Primary Examiner*—Edward G. Whitby
*Attorney, Agent, or Firm*—Craig & Antonelli

[57] ABSTRACT

Corner joint made up of miter-cut hollow profile members of plastic with or without an internal metallic reinforcing frame and with connectors introduced at the corners of the hollow profile member and likewise fitted in a miter-like way, characterized in that the connector is formed, on the miter surface, with grooves and projections of a minor depth and/or height, respectively, which are associated in a manner offset by 180° in mirror symmetry.

7 Claims, 4 Drawing Figures

CORNER JOINT FOR HOLLOW PROFILE MEMBERS OF PLASTIC WITH REINFORCING FRAME

This is a division of application Ser. No. 236,639 filed Mar. 21, 1972, now U.S. Pat. No. 3,836,274.

This invention relates in general to a corner joint formed of hollow profile members made of plastic and cut to a miter, and more particularly to inner metallic reinforcing frame members and connectors to be introduced in the corner joint formed of the hollow profile members, which reinforcing frame members and connectors are also fitted to a miter. The invention also relates to a process for the production of such a corner joint reinforcing arrangement.

In order to improve the strength of plastic hollow profile members, for example elements used for window frames and door frames, it is conventional to reinforce such members at the corners by the insertion of metallic hollow reinforcing members therein. In this connection, the problem encountered relates to producing a sufficiently firm corner joint with only the plastic profile member being welded at the corners. Since the high temperature occurring during a welding of the hollow metallic frame would burn up the plastic, it has been impossible to weld the metallic reinforcing members as well as the plastic profile members at the corners. Thus, while it is known to insert corner angles into the metallic hollow profile members prior to welding the plastic frame together, these closed corner angles make it necessary to divide the heating plates used for the welding of the plastic profile members and provide such heating plates with corresponding cutouts to avoid heating the metallic frame members.

Furthermore, it has been suggested to divide the corner angle and form the same from two paired legs, the contact surfaces of which are interdigitated so as to interlock in the manner of a comb, which legs are joined by means of an adhesive or cement. For the production of this joint, a heating plate is required which has a cutout for the penetration of the comb teeth; in addition, the welding machine must be specially designed in such a manner that both profile legs are simultaneously pressed together during the welding operation.

Symmetrically divided corner angles are known which are inserted into metallic hollow profile members. After welding by means of a simple heating plate, these corner angles are guided within the metallic hollow profile members through cutouts present in the profile members from the outside to the welded corner and are joined, for example, by means of screws. The disadvantage of this device is, above all, to be seen in the manufacturing of the corner angle joint, which requires a great amount of manual dexterity.

The invention has as its objective to overcome the disadvantages of the conventional corner joints, particularly to avoid the need for heating plates of complicated construction and to propose a simple corner joint which can be produced by means of a standard heating plate of undivided, closed configuration.

The corner joint of the present invention is distinguished in that the connector at the miter surface is formed with grooves and corresponding projections of a low depth and/or height, associated in a manner offset by 180° in a mirror symmetry. The identical profiling at the miter surface makes it possible, on the one hand, to make do with the manufacture of only a single corner part in order to establish the corner joint. At the same time, the profiling exhibits the advantage over smooth miter surfaces that the connectors are centered and a shifting or a nonuniform joining is thereby avoided. However, on the other hand, the profiling of the miter surfaces is of such a small height that no cutouts and/or divisions of the heating plate for welding the external plastic shell are required.

In a further development of the corner joint, the provision is made that the connector is provided with an outwardly projecting edge on the external edge of the miter corner. With the aid of this edge, the connector is prevented from sliding too far into the reinforcing frame. It is also possible to spread an adhesive, in a conventional manner, on the connector surfaces which make contact with the reinforcing frame in order to obtain a corresponding adhesive bond.

In order to be able to screw the connectors together, the connector is provided, at right angles to its miter surface, with a centrally arranged bore for the reception of a screw or rivet connection. Advantageously, the connector is formed with a recess in the zone of the bore on the outside, so that the screw connection can be countersunk. In the zone of the recess beside the bore, ribs are suitably provided at a spacing such that, on the one hand, the nut of a screw connection is clamped between the ribs and/or can be fixedly glued therebetween, and, on the other hand, a fitting screwhead, for example of a hollow screw, can be positioned between the ribs.

These and other objects, features and advantages of the present invention will become more apparent from the following detailed description, when taken in conjunction with the accompanying drawings, which illustrate one exemplary embodiment of the present invention, and wherein.

Figure 1:
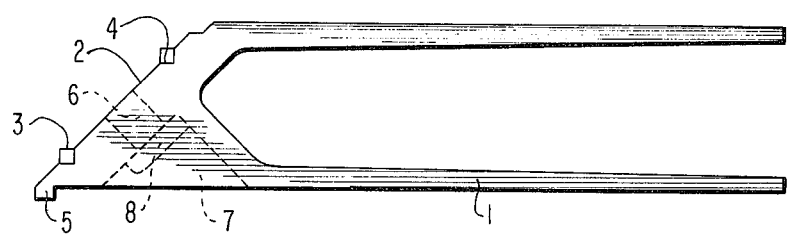
FIG. 1 is a side elevation of a connector formed in accordance with one embodiment of the present invention.
Figure 2:
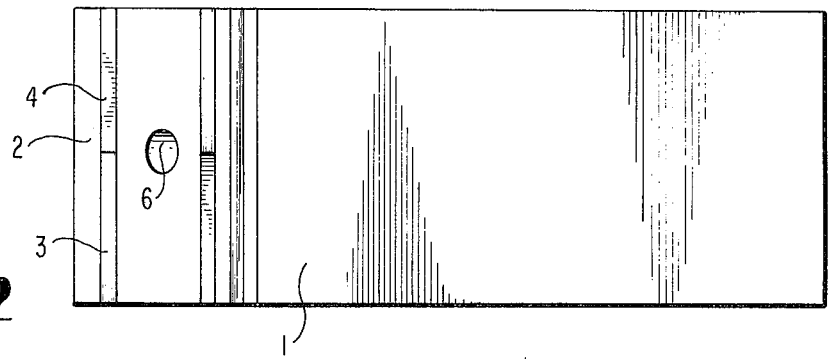
FIG. 2 is a top plan view of the connector of FIG. 1.
Figure 3:
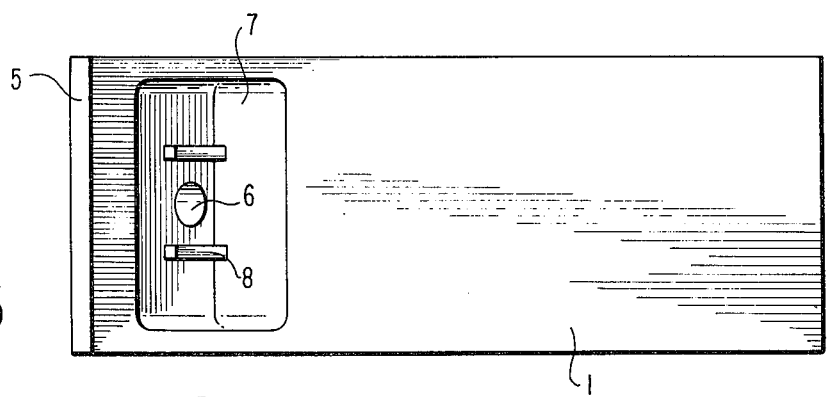
FIG. 3 is a bottom view of the connector of FIG. 1.
Figure 4:
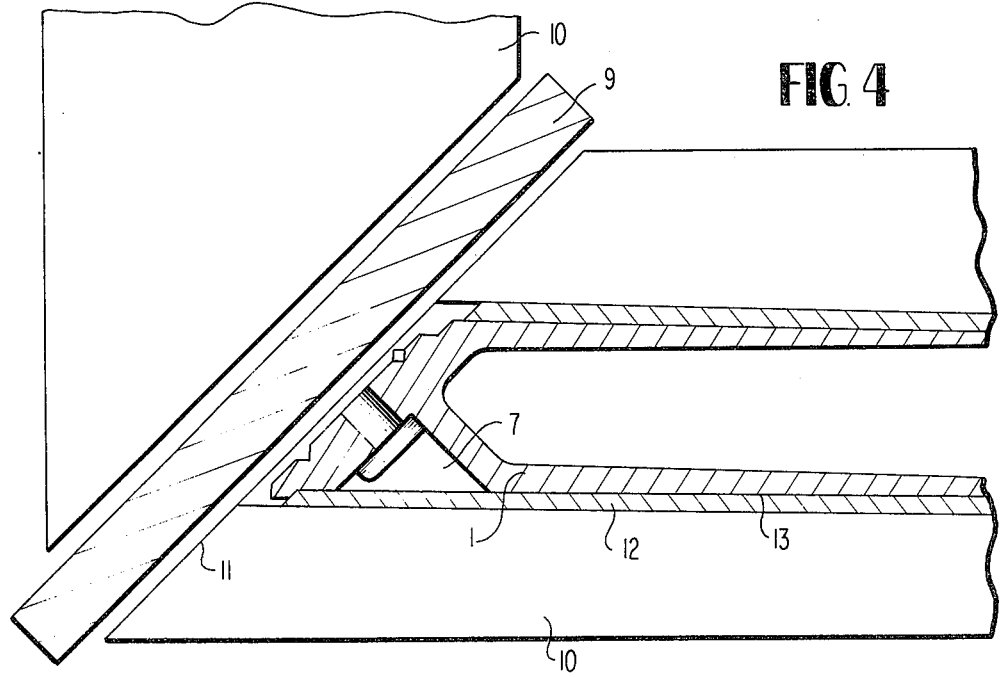
FIG. 4 is a cross section of the construction of a corner joint including the connector of the present invention.

In order to produce a reinforced corner for plastic hollow profile members, two identical connectors 1, fitted to a miter at the corner, are provided within a hollow metal reinforcing tube 12 (FIG. 4). The connector 1 which consists preferably of a light metal, e.g., aluminum, is illustrated in detail in FIGS. 1, 2 and 3.

On the miter surface 2 of the connector 1, tongues or projections 3 and grooves 4 are arranged in a manner offset by 180° in axial and mirror symmetry so as to fit together in face-to-face registration. At the outer miter corner, the outwardly projecting edge 5 is provided which contacts the end of the reinforcing tube 12 disposed within the hollow plastic profile member 19 (see FIG. 4).

Centrally within the miter surface 2 and at right angles thereto, a bore 6 is arranged in the connector 1. This bore terminates on the outside of the connector in the recess 7. Laterally of the bore 6, in parallel to the longitudinal axis of the connector and at some spacing from the bore, two ribs 8 are provided between which a nut (not shown) can be seated, clamped, or cemented, this nut being intended for engagement with a screw passing through the bore 6 from the outer connector. At the same time, the distance between the ribs 8 is sufficiently large that the screwhead also fits in between the ribs and can still be moved to effect securing of the members forming the corner to one another.

In FIG. 4, the joining of two identical plastic hollow profile members 10 with a reinforcing tube 12 inserted therein is illustrated. Both of these profile members are cut to the angle of a miter 11. From the corner, the connector 1 is inserted into the reinforcing tube 12; however, the extent of the insertion of the connector is limited by the projecting edge 5. The connector 1 and the reinforcing tube 12 can be joined in a force-derived connection or may be additionally secured together by means of adhesives applied in the zone of the contact surfaces 13 and/or by riveting. In the region of the miter 11, the plastic hollow profile member 10 projects at least up to the level of the tongues 3 of the connector 1, so that a one-piece closed heating plate 9, introduced between the hollow profile members 10, heats only the plastic shell. After heating, the heating plate 9 is pulled out, and the hollow profile members 10 are pressed together until the connectors 1 are in flush engagement at their miter surfaces 2.

The connectors 1 are joined together by the insertion of a screw which is introduced through openings (not shown) in the plastic hollow profile member 10 and in the reinforcing tube 12 from the outside into the bore 6. The opening in the plastic shell is thereafter again sealed in a corrosion-proof manner.

The advantage of the corner joint suggested according to this invention, which is of special significance economically, is to be seen in that any ordinary welding machine with a one-piece heating plate or heating blade can be utilized; in this regard, only one of the two plastic profile members to be joined need be shifted during the welding operation. The subsequent screw connection of the connectors from the outside, i.e., through apertures in the plastic profile member 10 and in the reinforcing frame 12 provides for a substantially shortened assembly time and a simplified assembly procedure, due to the presence of the fitting seat provided by the profiled configuration on the miter surfaces. The openings in the plastic shell are subsequently closed with a suitable corrosion-proof material, for example, so that no corrosion of the metal elements can occur.

It is also possible to employ the corner joint of this invention for those plastic hollow profile members which do not use an internal metallic reinforcement profile. This is accomplished by merely inserting the connectors directly into apertures in the plastic profile members so that the connector also serves as the reinforcing member.

The connectors are produced from metal or synthetic resin, preferably light metal, e.g., aluminum, for example by the casting method. Depending upon requirements, the connectors are fashioned to be more or less hollow, in order to attain, on the one hand, sufficient strength and, on the other hand, provide a saving in weight.

The process for the manufacture of the corner joint of the present invention resides essentially in inserting the connectors up to the abutment of the outer edge into the mitered ends of the reinforcing frames. Thereafter, the edges of the hollow plastic profile member which projects at least up to the level of the tongues or projections of the connectors are brought to the welding temperature by means of a one-part, closed heating blade. Then, the hollow profile members are pressed together to join the heated plastic parts, and thereafter the connectors are pressed together and secured at the corner by means of an externally introduced screw.

What is claimed is:

1. A process for the production of a corner joint formed of a pair of miter-cut profile members made of synthetic plastic material and each having a hollow internal metallic reinforcing frame disposed therein with a surface substantially coincident with the miter-cut surface of said profile member, the steps comprising
   inserting into said metallic reinforcing frame of each profile member a connector having a miter surface with a plurality of asymmetrical grooves and projections thereon and an outwardly projecting edge until the outwardly projecting edge contacts the end of said reinforcing frame,
   heating only the miter surface of each profile member with a one-piece, closed heating member,
   pressing together the miter surfaces of said profile members until the grooves and projections on said connectors come into registration, and
   securing said connectors together with fastening means.

2. A process according to claim 1, wherein the closed heating member is a heating blade and wherein the step of heating only the miter surface of each profile member includes:
   disposing the heating blade between the mitered surfaces of the respective profile members.

3. A process for the production of a corner joint formed of a pair of profile members made of a plastic material the ends of which are provided with a miter-cut surface, the process comprising the steps of:
   providing at least one hollow reinforcing frame for each profile member;
   disposing a hollow reinforcing frame in each of said profile members;
   providing connectors having a miter surface upon which is provided a plurality of grooves and projections;
   inserting one of said connectors in said hollow reinforcing frame of one of said profile members with the projections thereof being disposed so as to be in registry with the grooves of a connector inserted in the hollow reinforcing frame of the other of said profile members when the profile members are in the assembled condition;
   aligning the miter-cut surfaces of said profile members so as to define a space therebetween;
   inserting a heating means in said space;
   heating the miter-cut surfaces of each profile member to a predetermined welding temperature;
   removing the heating means from said space;
   joining the heated miter-cut surfaces of said profile members together; and
   securing said connectors to each other.

4. A process according to claim 3, wherein the step of inserting said hollow reinforcing frame includes:
   aligning the projections of the respective connectors with the edges of the miter-cut surfaces of said profile members.

5. A process according to claim 4, wherein the step of securing said connectors to each other includes:
   providing a bore in the miter surfaces of each of said connectors;

providing fastening means for securing the connectors to each other; and inserting said fastening means into the bores provided in the miter surfaces of said connectors.

6. A process according to claim 3, further comprising the step of:

applying an adhesive on surfaces of said connectors which contact surfaces of said hollow reinforcing frames prior to inserting said connectors into said frames.

7. A process for the production of a corner joint formed by a pair of hollow profile members made of a plastic material, the ends of said profile members being provided with a miter-cut surface, the process comprising the steps of:

providing connectors having a miter surface upon which is provided a plurality of grooves and projections;

inserting a connector into each of said hollow profile members with the respective projection of a connector disposed in one of said hollow profile members being in alignment with the grooves of the connector inserted in the other of said hollow profile members;

aligning the miter-cut surfaces of the hollow profile members so as to have a space therebetween;

inserting a single heating means in said space between said profile members;

heating the miter-cut surfaces of each profile member to a predetermined welding temperature;

removing the heating means from said space between said profile members;

joining the heated miter-cut surfaces of said profile members together; and securing said connectors to each other.

* * * * *